United States Patent Office 3,437,588
Patented Apr. 8, 1969

3,437,588
PROCESS FOR HYDROREFINING HYDRO-
CARBONS WITH A CATALYTIC MIX-
TURE OF INDIVIDUALLY-SUPPORTED
ACTIVE COMPONENTS
Stephen M. Kovach, Highland, Ind., and Edward S.
Rogers, Hinsdale, Ill., assignors to Sinclair Research,
Inc., New York, N.Y., a corporation of Delaware
No Drawing. Filed Oct. 8, 1965, Ser. No. 494,237
Int. Cl. C10g 23/02
U.S. Cl. 208—216          8 Claims

ABSTRACT OF THE DISCLOSURE

An improvement in a process for hydrorefining nitrogen and sulfur-contaminated hydrocarbons which comprises contacting the hydrocarbons with molecular hydrogen under hydrogenation conditions in the presence of a physical mixture of (A) a catalyst having a hydrogenation activity of at least 1.1, and a denitrogenation activity less than 0.7 and (B) a catalyst having a hydrogenation activity of less than 1.0, a denitrogenation activity of at least 0.2 and a ratio of denitrogenation activity to hydrogenation activity of at least 0.6. The weight ratio of catalyst (A) to catalyst (B) is from about 3:1 to about 1:3 and the physical mixture of the catalysts is such that catalysts (A) and (B) are individually supported on discrete particles.

---

This invention relates to the hydrorefining of mineral oils such as petroleum, coal tar or shale oil hydrocarbon fractions which in many cases contain non-hydrocarbon impurities, and particularly relates to a catalyst composition comprised of a physical mixture of a hydrogenation catalyst and a denitrogenation catalyst which is especially suited for the hydrofining of these hydrocarbon stocks. The overall catalyst compositions of this invention exhibit unusually high activities for denitrogenation, desulfurization and hydrogenation of olefins, aromatics, etc., of said hydrocarbon fractions.

The presence of sulfur and nitrogen in hydrocarbon oils has long been recognized as undesirable. Nitrogen compounds have a poisoning effect as they often tend to reduce or destroy the activity of catalysts employed to convert, e.g., crack, these stocks. The higher the nitrogen content of the charge stock, the higher will be the temperature required to effect a given amount of conversion which eventually requires more frequent regeneration or replacement of the catalyst. Sulfur compounds are highly objectionable in hydrocarbon oils as they have an unpleasant odor, tend to cause corrosion and often lead to sludging. These difficulties have led to various proposals for desulfurization and denitrogenation of almost all petroleum, coal tar and shale oil hydrocarbon fractions which are normally liquid or which can be made fluid at treating temperatures, including light distillates, middle and heavy distillates and even residual stocks. For instance, prior methods have included acid treatment, deasphalting and hydrogenolysis in contact with catalytic material such as molybdenum sulfide, tungsten oxide, nickel sulfide, tungsten sulfide, cobalt molybdate, nickel molybdate, etc. This latter hydrogenation treatment has become commonly known as hydrorefining or hydrofining. Such hydrogen treatment of the feedstocks has become widely accepted, but catalyst compositions are continually being sought which will effect high rates of hydrogenation with coinciding high denitrogenation rates. Certain catalysts are well known in the art for their excellent hydrogenation activities and others for their excellent denitrogenation activities. Until now the search for one catalyst composition exhibiting both of these features had led to the inclusion of both types of catalytic metals upon a single support particle. The effect of this combination, however, is usually resultant catalyst activities in both hydrogenation and denitrogenation which are less than the additive original activities of the parent elements. The rarity is the catalyst having either a denitrogenation or a hydrogenation activity equal to the additive effect of the individual components.

Accordingly, it is desired to devise a method of combining hydrogenation-active catalysts with denitrogenation-active catalysts in such a manner that the combination of the two can be used in a one-step hydrorefining process with results which would be cumulative of at least one of the properties of each catalyst. Such a catalyst combination would be one which would enable the industry to more nearly achieve maximum performance from each of the catalysts without necessitating the use of costly separate reactor systems, recycling or disproportionately large amounts of catalysts.

We have found that by employing a physical mixture of a hydrogenation catalyst and a denitrogenation catalyst in hydrorefining a hydrocarbon stock hydrogenation-denitrogenation activities are obtained which are greater than the expected cumulative results of the two catalysts in at least one of the activities, i.e., they exhibit a greater than cumulative hydrogenation activity or a greater than cumulative denitrogenation activity, or both.

Prior art attempts to reap the benefits of both hydrogenation and denitrogenation catalysts at the same time involved depositing both on the same support particles, but these attempts have usually been in vain. The hydrogenation activity of the thus combined catalysts has usually been less than the sum of the hydrogenation activities of each, rarely has it been equal to the sum. The same is true with respect to the denitrogenation activity. Surprisingly though, when the two catalysts are deposited on separate support particles and then used in admixture we have found that the hydrogenation activity of the mixture is greater than the sum of the hydrogenation activities of each catalyst, or that the denitrogenation activity of the mixture is greater than the sum of the denitrogenation activities of each catalyst, or that both activities are greater.

In accordance with the present invention the physical mixture of catalysts can be a particle-form mixture of the finely divided catalysts, or a single catalyst obtained by mixing of the individual catalyst powders or microspheres followed by macroforming, e.g., extrusion or tableting, or mixtures of macrosize tablets or extrudates of the individual catalysts.

By "hydrogenation catalyst" is here intended any catalyst having a hydrogenation activity of at least 1.1 and a denitrogenation activity less than 0.7; by "denitrogenation catalyst" is meant any catalyst having a hydrogenation activity less than 1.0, a denitrogenation activity of at least 0.2 and a ratio of denitrogenation activity to hydrogenation activity of at least 0.6. By "hydrogenation activity" or "hydrogenation rate" is meant the rate of change of refractive index of a solution of 1-methylnaphthalene and quinoline during hydrogenation of the solution in the presence of the catalyst in question; the units of measurement and conditions of hydrogenation will be explained hereinafter. By "denitrogenation activity" or "denitrogenation rate" is meant the rate of decrease of nitrogen concentration of a mixture of 1-methylnaphthalene and quinoline being hydrogenated in the presence of the catalyst being tested.

Specifically, the determination of the hydrogenation and denitrogenation activities of a catalyst is made by the following procedure:

Three grams of catalyst of a small enough particle size to pass a 30 mesh sieve is placed in a 300 cc. autoclave, any pretreatment of the catalyst which may be desired to take place at this time. The temperature of the bomb is then brought to 600° F., hydrogen is admitted to a pressure of 1000 p.s.i.g., and stirring at about 600 r.p.m. is begun. At this point 95 ml. of 1-methylnaphthalene containing 100 p.p.m. of nitrogen as quinoline is charged to the autoclave. The pressure of the system is maintained at 1000 p.s.i.g. Samples are drawn at timed intervals to measure the extent of change of refractive index. The original refractive index, $n_D^{25}$, of the hydrocarbon solution is 1.6180. The refractive index of the solution decreases in direct proportion to the extent of hydrogenation of the 1-methylnaphthalene; when 50% thereof has been converted to tetralin the refractive index will be about 1.5800. The heat, hydrogen feeding and stirring are discontinued at this 50% hydrogenation stage and the system cooled to room temperature. The catalyst is removed by filtration and the nitrogen concentration of the product solution is determined.

The hydrogenation activity of the catalyst tested is computed according to the following equation:

$$\text{Hydrogenation Activity} = \frac{\Delta n_D^{25} \times 10^4}{\text{time (minutes)}}$$

wherein $\Delta n_D^{25}$ is the difference between the hydrocarbon solution's beginning refractive index and final refractive index. (If the reaction is halted right at the 50% tetralin point, the $\Delta n_D^{25}$ will equal 1.6180–1.5800, or 0.0380.) The time in minutes refers to the total time of hydrogenation of the hydrocarbon solution.

Denitrogenation activity is quite simply arrived at by dividing the loss of nitrogen by the reaction time, according to the equation:

$$\text{Denitrogenation Activity} = \frac{\Delta \text{ p.p.m. N}}{\text{time (minutes)}}$$

wherein $\Delta$ p.p.m. N is the difference between the hydrocarbon solution's beginning concentration of nitrogen, i.e., 100 p.p.m., and final concentration of nitrogen.

According to the definitions of the present invention which shall be applied herein and in the claims, a catalyst which, when submitted to the above test, exhibits, for example, a hydrogenation activity of 1.5 and a denitrogenation activity of 0.6 is considered to be a "hydrogenation catalyst." On the other hand, a catalyst which, for example, tests for a hydrogenation activity of 0.8 and a denitrogenation activity of 0.5 is, according to the definition, a "denitrogenation catalyst" since the ratio of its denitrogenation activity to its hydrogenation activity is greater than 0.6 and the latter is less than 1.0.

As stated above, in accordance with the present invention, the catalyst composition employed must have a hydrogenation catalyst and a denitrogenation catalyst existing in their own entity rather than being prepared by impregnation or coprecipitation upon any one support particle. The ratio of the weight amount of hydrogenation catalyst to denitrogenation catalyst can vary from about 3/1 to 1/3 but is preferably in an approximate 1/1 ratio.

The catalysts utilized in the physical mixtures of the present invention may be in the particle sizes conventionally employed for the various types of catalyst beds, for instance less than 200 mesh for fluid operations or as macrosize particles in fixed or moving bed processes. Macrosize particles may be prepared by mixing the finely divided hydrogenation catalysts with the finely divided denitrogenation catalysts and extruding or tabletting to particles ranging, for instance, from about 1/32" to 1/2" in diameter and about 1/16" to 1" or more in length. Alternatively, the tablets or extrudates need not themselves be comprised of a physical mixture of the two catalysts but, rather, a mixture of tablets or extrudates consisting only of the hydrogenation catalyst with tablets or extrudates consisting only of the denitrogenation catalyst may also be employed.

The catalyst having high hydrogenation activity can be selected from any one or more of the more common hydrogenation catalysts known in the art, e.g., catalysts containing one or more of Group VIB and Group VIII metals, e.g., molybdenum, tungsten, cobalt, nickel, platinum, etc., on suitable supports such as inorganic oxides. An excellent hydrogenation catalyst is nickel and molybdena, or cobalt and molybdena, or alumina; the nickel or cobalt may comprise about 1–40 weight percent of the catalyst, preferably 2–6%; the molybdena about 5–30%, preferably 12–20%; and the balance alumina.

The catalyst having high denitrogenation-low hydrogenation activity may, for example, be selected from the supported oxides, sulfides and free metals of elements of Group VIII of the periodic table, or from the supported oxides and sulfides of the metals of Groups VB and VIB of the periodic table, e.g., vanadium, molybdenum, tungsten, etc. Catalysts such as molybdena-silica on alumina and molybdena-titania on alumina are exemplary denitrogenation catalysts. In general, high denitrogenation-low hydrogenation catalysts may be obtained by impregnating supports such as alumina, silica-alumina, titania-alumina, boria-alumina, silica, silica-titania, zirconia, etc., with 5 to 30 weight percent, preferably 12 to 20%, of vanadia, molybdena or tungsten trioxide.

Selection of catalysts for the physical catalyst mixture of this invention is limited, however, only by the aforementioned prerequisites of hydrogenation and denitrogenation activities, and examples given herein of suggested catalysts, percents of catalytic components, etc., are for the purpose of illustration and are in no way intended as limitations of the scope of the present invention.

If an alumina base is employed for either the hydrogeneration or denitrogenation catalyst, it can be any of the known hydrates in an activated or calcined form. Hydrates such as the monohydrate, boehmite; the trihydrates, bayerite I, nordstrandite and gibbsite; or another hydrous alumina which appears to be amorphous and preferably the hydrates which contain a major portion or consist essentially of boehmite may be employed. Calcination converts these hydrates to an activated or gamma family type alumina, e.g., gamma, delta, eta, chi, etc., depending on the composition of the hydrate and choice of calcination conditions. The alumina hydrate can be prepared by any of the conventional methods, for example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions.

Such alumina supports are usually characterized by a large surface area ranging from about 60 to 600 or more square meters per gram, preferably greater than about 200 square meters per gram as determined by the BET method. They may also have a relatively large content of pore volume in the pore size range of about 20 to 100 Angstrom units, of the order of greater than 0.3, preferably greater than 0.6, cc. per gram of pore volume in pores of this size, although mechanical steps of forming the catalyst into pellets, as by tabletting or extruding, may affect the amount of pore volume of this size. Typical alumina based catalysts made from boehmite alumina may have essentially no pores greater than about 50 Angstrom units in size and have pore distributions which are similar to those of silica-alumina. On the other hand, the catalysts made from aluminas containing high percentages of the crystalline trihydrates in the precursor alumina mixtures have considerable pore volume in the 100 to 1000 Angstrom units pore size range. These large pores do not occur in many alumina bases derived from the boehmite or monohydrate form of precursor alumina, either before or after calcination. The boehmite type of precursor alumina is often characterized by crystallite size of the order of 40 Angstrom units before and after calcination and contains no pores larger than 50 Angstrom units.

The catalytically active metals may be deposited on their respective supports in any suitable manner. One feasible method is to deposit the metal components on the support via an aqueous medium either as water-soluble compounds in solution, although an excess of the water-soluble materials may be present to give a slurry, or as relatively water-insoluble compounds in slurry form. Deposition of the catalysts on the carrier can be followed by various calcination and/or reduction processes.

As is well known in the art of hydrorefining, the hydrogenation and denitrogenation activities of catalysts are enhanced when the activating metals are converted to their sulfide forms. The catalyst compositions of the present invention may likewise be sulfided. The sulfiding step may be accomplished in many different ways, but generally comprises passing hydrogen sulfide, either pure or diluted with another gas such as, for instance, hydrogen over a bed of the activated catalyst mixture at temperatures usually from about 400 to 700° F., for a time sufficient to convert a significant portion of the catalytic metals to their respective sulfides. Alternatively, the catalyst may be sulfided by the processing of a sulfur-containing feed. Air is preferably excluded from the catalyst after this sulfiding step.

The hydrorefining of the hydrocarbon stock is conducted under conventional hydrogenation conditions; generally a temperature of about 400 to 800° F., preferably 500 to 700° F., a pressure of about 0 to 3,000 pounds per square inch gauge (p.s.i.g.), preferably 100 to 2,000 p.s.i.g., a weight hourly space velocity of feed to total catalyst (WHSV) of about 0.1 to 10, preferably 0.25 to 5 WHSV, and a molar ratio of hydrogen to hydrocarbon of from about 1/1 to 20/1, preferably from 1/1 to 10/1, may be employed.

The aforementioned test procedure was used to compare the hydrogenation and denitrogenation activities of the catalyst compositions of this invention with analogous catalysts of the prior art, as follows:

The exact weight of catalyst to be tested was crushed and screened to 30 mesh or finer and placed in a 300 cc. Autoclave Engineers Magnedrive packless autoclave. Pretreatment of the catalyst consisted of evacuation of the bomb with house vacuum and pressuring with 250 p.s.i.g. hydrogen sulfide for ten minutes at room temperature with stirring (600 r.p.m.).

The system was depressured to 50 p.s.i.g. hydrogen sulfide and heating started with stirring. The temperature was raised from room temperature to 600° F., overnight (ca. 16 hours), at this point stirring was stopped, hydrogen admitted to a total pressure of 1000 p.s.i.g., 95 ml. of hydrocarbon pressured from a blowcase to the bomb and the stirring was restarted. The system was such that a continual pressure of 1000 p.s.i.g. hydrogen was on the contents of the bomb at all times. At intervals of 30 minutes or multiples thereof a small sample (2–3 ml.) was withdrawn from the bomb and a refractive index taken on the sample. When the refractive index reached 1.5800 (representing approximately 50% hydrogenation to the tetralin stage) the heat, hydrogen, and stirring were shut off and the bomb cooled to room temperature. Decalin production was checked by gas chromatography but none was found in these runs. The bomb was dismantled and the hydrocarbon separated from the catalyst by filtration. Products were submitted for total N (p.p.m.) analyses to determine denitrogenation activity.

The following tables give the results obtained with several of the catalyst mixtures contemplated by the present invention and with comparable prior art catalysts.

TABLE I
Conditions: 600° F., 1,000 p.s.i.g, 1,000 r.p.m.
Feed: 95 ml. 1-methylnaphthalene plus 100 p.p.m. N as quinoline

| | Run | | |
|---|---|---|---|
| | I | II | III |
| | Catalyst | | |
| | 4% Ni–16% MoO$_3$/Al$_2$O$_3$, 3 g. | 1% Re–1% Ru/Al$_2$O$_3$, 3 g. | 4% Ni–16% MoO$_3$/Al$_2$O$_3$, 3 g. 1% Re–1% Ru/Al$_2$O$_3$, 3 g. |
| Calculated: | | | |
| $\Delta n_D{}^{25} \times 10^4$/min | | | 1.903 |
| $\Delta$ p.p.m. N/min | | | 0.750 |
| Observed: | | | |
| $\Delta n_D{}^{25} \times 10^4$/min | 1.49 | 0.413 | 2.61 |
| $\Delta$ p.p.m. N/min | 0.432 | 0.318 | 0.815 |

In Table I are given the hydrogenation and denitrogenation activities for a nickel-molybdate on alumina and rhenium-ruthenium on alumina catalyst. In Run III is given the result obtained with a physical mixture of these two catalysts. The observed rates of hydrogenation and denitrogenation obtained with the mixture are both better than the calculated rates if one expected an additive effect (calculated rate for Run III is the sum of the observed rates for Runs I and II).

TABLE II
Conditions: 600° F., 1,000 p.s.i.g., 1,000 r.p.m.
Feed: 95 ml. 1-methylnaphthalene plus 100 p.p.m. N as quinoline

| | Run | | | |
|---|---|---|---|---|
| | I | IV | V | VI |
| | Catalyst | | | |
| | 4% Ni–16% MoO$_3$/Al$_2$O$_3$, 3 g. | 25% V$_2$O$_5$/Al$_2$O$_3$, 3 g. | 4% Ni–16% MoO$_3$/Al$_2$O$_3$, 3 g. 25% V$_2$O$_5$/Al$_2$O$_3$, 3 g. | 4% Ni–16% MoO$_3$–23% V$_2$O$_5$/Al$_2$O$_3$, 3 g. |
| Calculated: | | | | |
| $\Delta n_D{}^{25} \times 10^4$/min | | | 1.931 | 1.931 |
| $\Delta$ p.p.m. N/min | | | 0.802 | 0.802 |
| Observed: | | | | |
| $\Delta n_D{}^{25} \times 10^4$/min | 1.49 | 0.441 | 2.29 | 1.24 |
| $\Delta$ p.p.m. N/min | 0.432 | 0.370 | 0.767 | 0.402 |

In Table II are shown the results obtained with a nickel-molybdate-alumina catalyst and vanadia-alumina catalyst. Vanadia-alumina had low hydrogenation-high denitrogenation activity. In Run V is given the results with a mixture of these two catalysts. The observed hydrogenation rate is higher than that calculated on an additive basis of the hydrogenation activities and the denitrogenation rate is slightly lower but within experimental error. Combination of these two catalysts upon the same support particles by impregnation yielded the catalyst composition reported in Run VI. This catalyst composition gave results inferior to the baseline catalyst (Run I) and the mixture of the two catalyst powders (Run V). This gives further evidence of the uniqueness of this system of employing a denitrogenation catalyst in combination with a hydrogenation catalyst.

calculated) have increased by a factor of greater than unity. Also, comparison of denitrogenation rates for Runs III and V show that these systems give higher denitrogen-

TABLE III

Conditions: 600° F., 1,000 p.s.i.g., 1,000 r.p.m.
Feed: 95 ml. 1-methylnaphthalene + 100 p.p.m. N as quinoline

| | Run | | |
|---|---|---|---|
| | I | VII | VIII |
| | Catalyst | | |
| | 4% Ni-16% MoO$_3$/Al$_2$O$_3$, 3 g. | CoAl$_2$O$_4$, 3 g. | 4% Ni-16% MoO$_3$/Al$_2$O$_3$, 3 g. CoAl$_2$O$_4$, 3 g. |
| Calculated: | | | |
| $\Delta n_D^{25} \times 10^4$/min | | | 1.72 |
| $\Delta$ p.p.m. N/min | | | 0.827 |
| Observed: | | | |
| $\Delta n_D^{25} \times 10^4$/min | 1.49 | 0.23 | 1.98 |
| $\Delta$ p.p.m. N/min | 0.432 | 0.395 | 0.616 |

In Table III is given another example of combining an active hydrogenation catalyst (Run I) with a denitrogenation catalyst (Run VII) under the conditions of this invention. Run VIII gives the results obtained with such a mixture and shows that the observed hydrogenation activity was greater than that calculated by the addition of the hydrogenation activities of the individual catalysts, although the denitrogenation activity did not rise to the calculated amount.

Although it would appear that the same results experienced by the processes of this invention could be achieved by doubling the charge of the baseline catalyst (4% Ni–16% MoO$_3$/Al$_2$O$_3$) or increasing the contact time of the feed with the catalyst, such a supposition is controverted by the comparative results illustrated in ation rates than those resulting from doubling the catalyst charge. Numerically the difference in these denitrogenation rates are not great, but if one compares nitrogen in the product, the slight differences in rate means operating at a product N level of 2 p.p.m. or less compared to 8 p.p.m.

This difference in nitrogen content of the product greatly affects the catalyst activity if the product is further processed under hydrocracking conditions, and affects conversion rate and aging rate of the catalyst.

Sulfided molybdena catalysts also exhibit excellent denitrogenation properties with poor hydrogenation activity. Tables V through VII give the results obtained with these catalysts on various supports and with different hydrogenation catalysts.

TABLE V

Conditions: 600° F., 1,000 p.s.i.g., 1,000 r.p.m.
Feed: 95 ml. 1-methylnaphthalene plus 100 p.p.m. N as quinoline

| | Run | | |
|---|---|---|---|
| | I | X | XI |
| | Catalyst | | |
| | 4% Ni-16% MoO$_3$-Al$_2$O$_3$, 3 g. | 16% MoO$_3$-Al$_2$O$_3$, 3 g. | 4% Ni-16% MoO$_3$-Al$_2$O$_3$, 3 g. 16% MoO$_3$-Al$_2$O$_3$, 3 g. |
| Calculated: | | | |
| $\Delta n_D^{25} \times 10^4$/min | | | 2.176 |
| $\Delta$ p.p.m. N/min | | | 0.846 |
| Observed: | | | |
| $\Delta n_D^{25} \times 10^4$/min | 1.49 | 0.686 | 2.90 |
| $\Delta$ p.p.m. N/min | 0.432 | 0.414 | 0.770 |

Table IV. The hydrogenation-denitrogenation rates therein are based upon the ratio of the observed to the calculated rates.

TABLE IV

| | Run | | | | |
|---|---|---|---|---|---|
| | I | III | V | VIII | IX |
| Observed/Calculated | Catalyst | | | | |
| | 4% Ni-16% MoO$_3$/Al$_2$O$_3$, 3 g. | 4% Ni-16% MoO$_3$/Al$_2$O$_3$, 3 g. 1% Re-1% Ru/Al$_2$O$_3$, 3 g. | 4% Ni-16% MoO$_3$/Al$_2$O$_3$, 3 g. 25% V$_2$O$_5$/Al$_2$O$_3$, 3 g. | 4% Ni-16% MoO$_3$/Al$_2$O$_3$, 3 g. CoAl$_2$O$_4$, 3 g. | 4% Ni-16% MoO$_3$/Al$_2$O$_3$, 3 g. 4% Ni-16% MoO$_3$/Al$_2$O$_3$, 3 g. |
| Hydrogenation | 1 | 1.35 | 1.2 | 1.15 | 0.93 |
| Denitrogenation | 1 | 1.09 | 0.975 | 0.745 | 0.88 |

Thus, with the baseline catalyst, as one increases the amount of catalyst (Run IX) a corresponding increase in activity is not obtained. The ratio of hydrogenation and denitrogenation rates (observed/calculated) increases by a factor of less than unity. With the other catalysts (Runs III, V and VIII) hydrogenation ratios (observed/calculated) have increased by a factor of greater than unity.

Nickel-molybdena-alumina when mixed with a molybdena-alumina catalyst gave higher hydrogenation rates than that calculated for the individual components. Denitrogenation activity was slightly lower than calculated but not enough to offset the gain in hydrogenation.

TABLE VI

Conditions: 600° F., 1,000 p.s.i.g., 1,000 r.p.m.
Feed: 95 ml. 1-methylnaphthalene plus 100 p.p.m. N as quinoline

| | Run | | | | |
|---|---|---|---|---|---|
| | I | XII | XIII | XIV | XV |
| | Catalyst | | | | |
| | 4% Ni-16% MoO$_3$-Al$_2$O$_3$, 3 g. | 16% MoO$_3$-SiO$_2$-Al$_2$O$_3$, 3 g. | 4% Ni-16% MoO$_3$-Al$_2$O$_3$, 3 g. 16% MoO$_3$-SiO$_2$-Al$_2$O$_3$, 3 g. | 16% MoO$_3$-TiO$_2$-Al$_2$O$_3$, 3 g. | 4% Ni-16% MoO$_3$-Al$_2$O$_3$, 3 g. 16% MoO$_3$-TiO$_2$-Al$_2$O$_3$, 3 g. |
| Calculated: | | | | | |
| $\Delta n_D^{25} \times 10^4$/min | | | 2.36 | | 2.26 |
| $\Delta$ p.p.m. N/min | | | 0.965 | | 0.884 |
| Observed: | | | | | |
| $\Delta n_D^{25} \times 10^4$/min | 1.49 | 0.870 | 3.27 | 0.775 | 3.49 |
| $\Delta$ p.p.m. N/min | 0.432 | 0.533 | 1.09 | 0.452 | 1.06 |

Table VI gives the results from mixing a nickel-molybdena-alumina catalyst with a molybdena on silica-alumina or titania-alumina catalyst. In both cases (Runs XIII and XV) the observed hydrogenation and denitrogenation rates were greater than the calculated rates.

Tungsten sulfide, which also exhibits excellent denitrogenation activity with poor hydrogenation activity, was also tried on silica-alumina and titania-alumina carriers and likewise gave increased rates over those calculated for mixtures with the standard nickel-molybdena-alumina hydrogenation catalyst.

In Table II was shown the results of combining the hydrogenation and denitrogenation catalysts upon the same support particles. The resulting activity is below that calculated for the addition of the individual components. In Table VII are compared the results obtained with the individual catalysts, with a physical mixture, and with a mixed extrudate.

TABLE VII

Conditions: 600° F., 1,000 p.s.i.g., 1,000 r.p.m.
Feed: 95 ml. 1-methylnaphthalene plus 100 p.p.m. N as quinoline

| | Run | | | |
|---|---|---|---|---|
| | XVI | XVII | XVIII | XIX |
| | Catalyst | | | |
| | 16% MoO$_3$-SiO$_2$-Al$_2$O$_3$, 3 g. | 16% MoO$_3$-NiAl$_2$O$_4$, 3 g. | 16% MoO$_3$-NiAl$_2$O$_4$, 3 g. 16% MoO$_3$-SiO$_2$-Al$_2$O$_3$, 3 g. | 16% MoO$_3$-NiAl$_2$O$_4$ SiO$_2$-Al$_2$O$_3$, 6 g. |
| Calculated: | | | | |
| $\Delta n_D^{25} \times 10^4$/min | | | 2.890 | 2.890 |
| $\Delta$ p.p.m. N/min | | | 1.079 | 1.079 |
| Observed: | | | | |
| $\Delta n_D^{25} \times 10^4$/min | 0.870 | 2.02 | 4.26 | 3.36 |
| $\Delta$ p.p.m. N/min | 0.533 | 0.546 | 1.032 | 1.066 |

Runs XVI and XVII give the results for the molybdena on silica-alumina and molybdena on nickel aluminate catalysts, respectively. Run XVIII gives the results for a physical mixture of the powders of these two catalysts. Run XIX was performed with the mixed extrudate of these two components. It was prepared by extruding the nickel aluminate and silica-alumina, calcining, and then impregnating with sufficient molybdena to yield 16 wt. percent MoO$_3$, based on the weight of the catalyst. Both methods yield active catalyst compositions with hydrogenation activities greater than the calculated values and denitrogenation activities of high activity and almost approaching the calculated values. With such high denitrogenation activities these differences between observed and calculated values are within experimental error.

The catalyst compositions of the present invention have been found to be useful for the removal of non-hydrocarbon impurities and for the hydrogenation of unsaturated, i.e., olefinic, aromatic, etc., hydrocarbons from a variety of petroleum, coal tar and shale oil fractions for the production of chemicals, lubricating oils and fuels. The catalyst compositions of the present invention can be used for treating mineral hydrocarbon stocks comprising base stocks for lubricants, lighter petroleum distillates such as a gas oil for catalytic cracking and hydrocracking, wax distillates from paraffinic crudes, catalytically cracked distillates, coal tar distillates and the like. These catalyst compositions have been found effective for the pretreatment of feedstocks for catalytic cracking including reduction in the concentration of sulfur, oxygen and nitrogen compounds, and of components which tend to produce excessive quantities of carbonaceous deposits in catalytic cracking, as well as the hydrogenation of such stocks to improve conversion and selectivity in catalytic cracking. Although the test examples were conducted as batchwise operations, it is to be understood that the hydrorefining process using the catalyst compositions of the present invention can be conducted batchwise or continuously by methods well known in the art.

It is claimed:

1. In a process for hydrorefining nitrogen and sulfur-contaminated hydrocarbons the improvement which comprises contacting said hydrocarbons with molecular hydrogen under hydrogenation conditions in the presence of a physical mixture of (A) a catalyst having a hydrogenation activity of at least 1.1 and a denitrogenation activity less than 0.7, said catalyst consisting essentially of a support having deposited thereon catalytically-active components containing at least one metal selected from the group consisting of nickel, cobalt, tungsten, molybdenum and platinum, and (B) a catalyst having a hydrogenation activity of less than 1.0, a denitrogenation activity of at least 0.2 and a ratio of denitrogenation activity to hydrogenation activity of at least 0.6, said catalyst consisting essentially of a support having deposited thereon catalytically-active components containing at least one metal selected from the group consisting of metals of Group VIII of the periodic table, vanadium, molybdenum and tungsten, the weight ratio of (A) to (B) being from about 3/1 to about 1/3, and said physical mixture being such that (A) and (B) are individually supported on discrete particles.

2. The process of claim 1 wherein said hydrogenation conditions include a temperature of about 400 to 800° F., a pressure of about 0–3,000 p.s.i.g., a weight hourly space velocity of about 0.1 to 10 WHSV and a molar ratio of hydrogen to hydrocarbon feed of from about 1/1 to 20/1.

3. The process of claim 2 wherein said hydrogenation conditions include a temperature of 500 to 700° F., a pressure of 100 to 2,000 p.s.i.g., a weight hourly space velocity of 0.25 to 5 WHSV and a molar ratio of hydrogen to hydrocarbon feed of from 1/1 to 10/1.

4. The process of claim 1 wherein (A) is a sulfided nickel and molybdena on alumina catalyst and (B) is a sulfided molybdena on titania-alumina catalyst.

5. The process of claim 1 wherein (A) is a sulfided nickel and molybdena on alumina catalyst and (B) is a sulfided molybdena on silica-alumina catalyst.

6. The process of claim 1 wherein (A) is a nickel and molybdena on alumina catalyst and (B) is a vanadia on alumina catalyst.

7. In a process for hydrorefining nitrogen and sulfur-contaminated hydrocarbons the improvement which comprises contacting said hydrocarbons with molecular hydrogen under hydrogenation conditions, including a temperature of 500 to 700° F., a pressure of 100 to 2,000 p.s.i.g., a weight hourly space velocity of 0.25 to 5 WHSV and a molar ratio of hydrogen to hydrocarbon feed of from 1/1 to 10/1, in the presence of a physical mixture of (A) a sulfided nickel and molybdena on alumina catalyst and (B) a sulfided molybdena on silica-alumina catalyst, the weight ratio of (A) to (B) being from about 3/1 to 1/3.

8. In a process for hydrorefining nitrogen and sulfur-contaminated hydrocarbons the improvement which comprises contacting said hydrocarbons with molecular hydrogen under hydrogenation conditions, including a temperature of 500 to 700° F., a pressure of 100 to 2,000 p.s.i.g., a weight hourly space velocity of 0.25 to 5 WHSV and a molar ratio of hydrogen to hydrocarbon feed of from about 1/1 to 10/1, in the presence of a physical mixture of (A) a nickel and molybdena on alumina catalyst and (B) a vanadia on alumina catalyst, the weight ratio of (A) to (B) being from about 3:1 to 1:3.

References Cited

UNITED STATES PATENTS

| | | | |
|---|---|---|---|
| 3,003,953 | 10/1961 | Evans | 208—254 |
| 3,287,252 | 11/1966 | Young | 208—111 |
| 3,331,769 | 7/1967 | Gatsis | 208—264 |

DELBERT E. GANTZ, *Primary Examiner.*

G. J. CRASANAKIS, *Assistant Examiner.*

U.S. Cl. X.R.

208—217, 254